United States Patent
Kumar et al.

(10) Patent No.: US 12,015,316 B2
(45) Date of Patent: Jun. 18, 2024

(54) HIGH TEMPERATURE AND HIGH POWER DENSITY AXIAL FLUX MOTOR

(71) Applicant: Honeywell International Inc., Charlotte, NC (US)

(72) Inventors: Chandan Kumar, Bangalore (IN); Deepak Pitambar Mahajan, Bangalore (IN); Renukaprasad N, Bangalore (IN); Subhashree Rajagopal, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 162 days.

(21) Appl. No.: 17/557,798

(22) Filed: Dec. 21, 2021

(65) Prior Publication Data
US 2023/0124875 A1 Apr. 20, 2023

(30) Foreign Application Priority Data
Oct. 19, 2021 (IN) .............................. 202111047360

(51) Int. Cl.
*H02K 3/24* (2006.01)
*H02K 15/12* (2006.01)
*H02K 21/24* (2006.01)

(52) U.S. Cl.
CPC .............. *H02K 3/24* (2013.01); *H02K 15/12* (2013.01); *H02K 21/24* (2013.01)

(58) Field of Classification Search
CPC ........ H02K 1/2798; H02K 15/12; H02K 3/22; H02K 3/24; H02K 21/24; H02K 9/005; H02K 9/19; H02K 3/493; H02K 3/30; H02K 16/02
See application file for complete search history.

(56) References Cited

U.S. PATENT DOCUMENTS

| | | | |
|---|---|---|---|
| 4,187,441 A | 2/1980 | Oney | |
| 4,900,965 A | 2/1990 | Fisher | |
| 7,034,422 B2 | 4/2006 | Ramu | |
| 7,250,704 B1 | 7/2007 | Sortore et al. | |
| 8,692,115 B2 | 4/2014 | Rumbaugh et al. | |

(Continued)

FOREIGN PATENT DOCUMENTS

| | | |
|---|---|---|
| CA | 2143637 C | 3/1994 |
| EP | 3793062 A1 | 3/2021 |

OTHER PUBLICATIONS

Kevin Clemens, "A New Generation of Axial Flux EV Motors", https://www.designnews.com/content/new-generation-axial-flux-ev-motors/186519862158706 (10 pages) (May 23, 2018).

*Primary Examiner* — Leda T Pham
(74) *Attorney, Agent, or Firm* — Alston & Bird LLP (57) ABSTRACT

An axial flux motor may include a motor housing, a shaft rotatably mounted in the housing, and a stator mounted in the motor housing, and having a stator ring and a through-hole through which the shaft extends. Two rotors may be mounted on the shaft within the motor housing on opposing sides of the stator, each rotor having a plurality of magnets arranged radially on a stator-facing surface thereof. In addition, magnet wire may be wound on portions of the stator, the magnet wire comprising an inner coolant passage disposed within a copper tube, and a green glass coating on an outer surface of the copper tube, the green glass coating comprising glass solids, one or more of surfactants, solvents, and polymers.

20 Claims, 6 Drawing Sheets

(56) References Cited

U.S. PATENT DOCUMENTS

| | | | |
|---|---|---|---|
| 9,515,530 B2* | 12/2016 | Ho | H02K 9/227 |
| 2012/0049685 A1* | 3/2012 | Wang | H02K 1/182 |
| | | | 310/156.32 |
| 2015/0001979 A1* | 1/2015 | Deguchi | H02K 21/24 |
| | | | 310/156.37 |
| 2019/0058375 A1* | 2/2019 | Tokoi | H02K 3/345 |

* cited by examiner

FIG. 9

HIGH TEMPERATURE AND HIGH POWER DENSITY AXIAL FLUX MOTOR

CROSS-REFERENCE TO RELATED APPLICATION(S)

This application claims the benefit of priority under 35 U.S.C. § 119 from Indian Patent Application No. 202111047360, filed on Oct. 19, 2021, the contents of which are incorporated by reference in their entirety.

TECHNICAL FIELD

Various embodiments of the present disclosure relate generally to an axial flux motor, and in particular, to a high temperature and high power density axial flux motor for use in power systems for aerial vehicles.

BACKGROUND

Demand for urban air motility (UAM) and, in particular, urban air vehicles (UAVs) is increasing and, therefore, demand for power systems, including motors capable of high power density and capable of sustaining high temperatures, is increasing, as well. Aerial vehicles, in particular, require high power motors for propulsion, requiring a power density greater than 10 kW/kg, with limited allowable weight and space. Currently available systems, however, have a power density in the range of 3 kW/kg to 5 kW/kg. In addition, radial flux motors are typically used for such applications, though these types of motors are limited in power density. Further, temperature control measures are needed to maintain relatively low temperatures of available systems to prevent overheating and malfunction thereof. There is a need, therefore, for a power system having a relatively smaller size, reduced losses, greater current carrying capacity for greater power density, and greater tolerance to high temperatures, as compared to currently available systems.

The present disclosure is directed to addressing one or more of these above-referenced needs.

SUMMARY OF THE DISCLOSURE

According to certain aspects of the disclosure, an axial flux motor may include a motor housing, a shaft rotatably mounted in the housing, and a stator mounted in the motor housing, and having a stator ring and a through-hole through which the shaft extends. The motor may also include two rotors mounted on the shaft within the motor housing on opposing sides of the stator, each rotor having a plurality of magnets arranged radially on a stator-facing surface thereof, and magnet wire wound on portions of the stator, the magnet wire comprising an inner coolant passage disposed within a copper tube, and a green glass coating on an outer surface of the copper tube, the green glass coating comprising glass solids, one or more of surfactants, solvents, and polymers.

According to other aspects of the disclosure, an axial flux motor may include a motor housing, a shaft rotatably mounted in the housing, and a stator mounted in the motor housing, and having a through-hole through which the shaft extends, and being formed of a grain-oriented magnetic steel. The motor may also include two rotors mounted on the shaft within the motor housing on opposing sides of the stator, each rotor having a plurality of magnets arranged radially on a stator-facing thereof, the two rotors being formed of steel, and magnet wire wound around the stator, the magnet wire comprising an inner coolant passage disposed within a copper tube, and a green glass coating on an outer surface of the copper tube, the green glass coating comprising glass solids, one or more of surfactants, solvents, and polymers, and the magnet wire being arranged in a three-phase winding.

According to still other aspects of the disclosure, a method of manufacturing an axial flux motor may include preparing a magnet wire with a high temperature insulation, including providing a copper tube having a coolant passage therein, forming a liquid green glass coating, including suspending glass solids in an aqueous solution containing one or more surfactants, solvents, and polymers, coating the copper tube with the liquid green glass, and heating the coated copper tube, thereby removing carbon from the coated copper wire, and forming the magnet wire. The method may also include forming stator coils by winding the magnet wire around each of a plurality of stator poles, dipping the plurality of stator poles including the stator coils into cement, baking the dipped plurality of stator poles including the stator coils at a predetermined temperature, assembling the segmented stator poles with a stator ring, thereby forming a stator, mounting the stator in a housing, mounting a shaft rotatably within the housing, the shaft extending through a through-hole of the stator, and mounting two rotors on the shaft within the housing, the two rotors being mounted on opposing sides of the stator, and each rotor having a plurality of magnets arranged radially on a stator-facing surface thereof.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
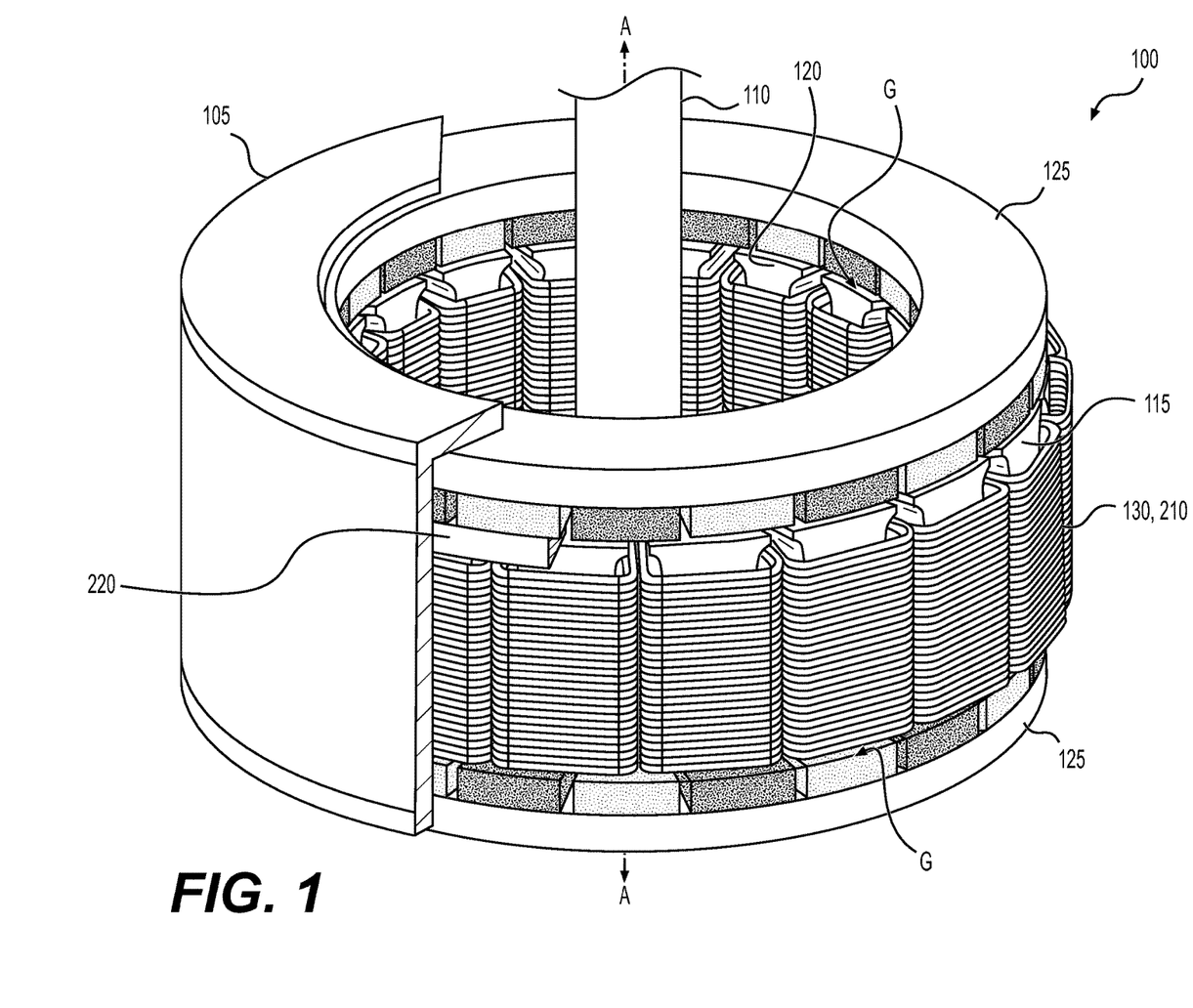
FIG. 1 is a schematic cutaway view of a dual rotor axial flux motor, according to one or more embodiments.

FIG. 1 is a schematic cutaway view of a dual rotor axial flux motor 100 having a motor housing 105, a shaft 110 rotatably mounted in the motor housing 105, a stator 115 mounted in the motor housing 105 with the shaft 110 extending through a through-hole defined by an inner surface 120 of the stator 115, and two rotors 125 mounted on the shaft 110 within the motor housing 105. Each of the motor housing 105, the stator 115, and the two rotors 125 may have a generally cylindrical shape in a plane that is perpendicular to a longitudinal axis A-A of the shaft 110. The two rotors 125 are mounted on the shaft 110 and within the motor housing 105, on opposing sides of the stator 115, relative to the longitudinal axis A-A of the shaft 110, with axial airgaps G being formed between each rotor 125 and the stator 115. By virtue of providing the two rotors 125 on opposing sides of the stator 115, it is possible to balance the magnetic forces acting on the stator. The axial flux motor 100 further includes a magnet wire 130, which is installed on the stator 115, and described in more detail below.

Figure 2:
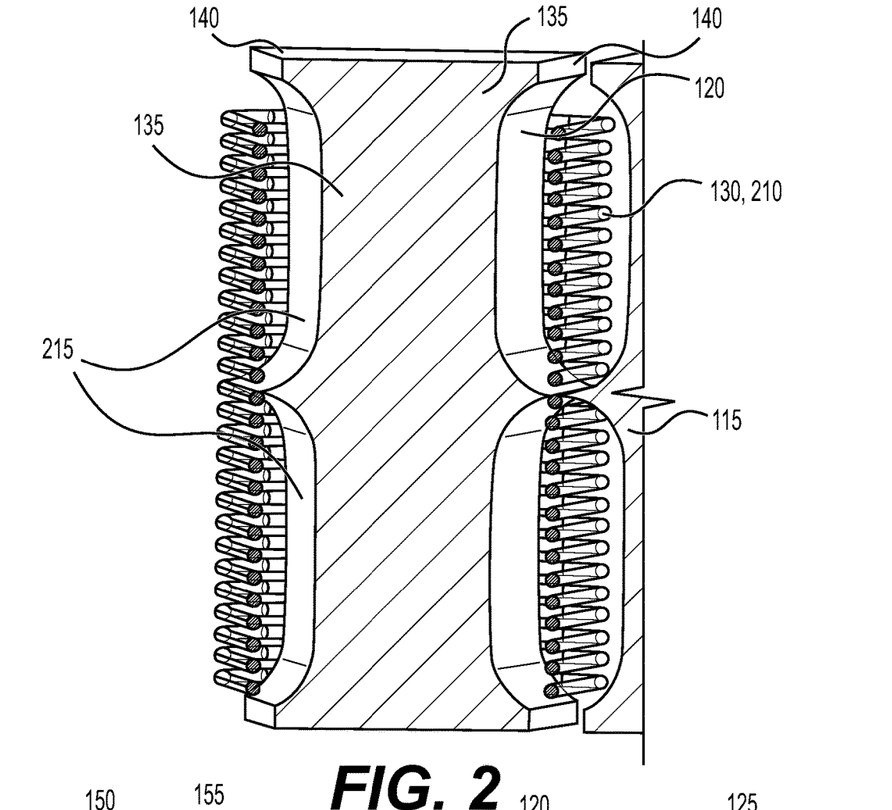
FIG. 2 is a schematic cross-sectional view of a tooth of a stator of the axial flux motor and magnet wire wound around the tooth, according to one or more embodiments.

FIG. 2 shows a cross-sectional view of a portion of the stator 115, according to one embodiment. The stator 115 may have a plurality of stator poles 135, with inner surfaces of the stator poles 135 defining a through-hole through which the shaft 110 extends when the axial flux motor 100 is assembled. Each stator pole 135 has a plurality of teeth 140 and a plurality of slots 215. Stator 115 may be constructed by assembling segmented, or separate, stator poles 135 together using a stator ring 220, shown in FIG. 1. In particular, one end of each stator poles 135 may be retained within the stator ring 220. In an alternative embodiment, stator 115 may have a cylindrical core integrally formed with the stator poles 135, with the cylindrical core defining a through-hole for the shaft 110. The stator 115 may be formed of a non-magnetic magnetic material, and, in particular, may be formed of a material selected from the group consisting of ceramic, carbon fiber, and/or aluminum. In addition or alternatively, the stator 115 may be formed of a grain oriented magnetic steel, or an amorphous metal, for example, although other materials may be used to form the stator 115. In addition, the stator 115 may be prepared using steel lamination.

Figure 3:
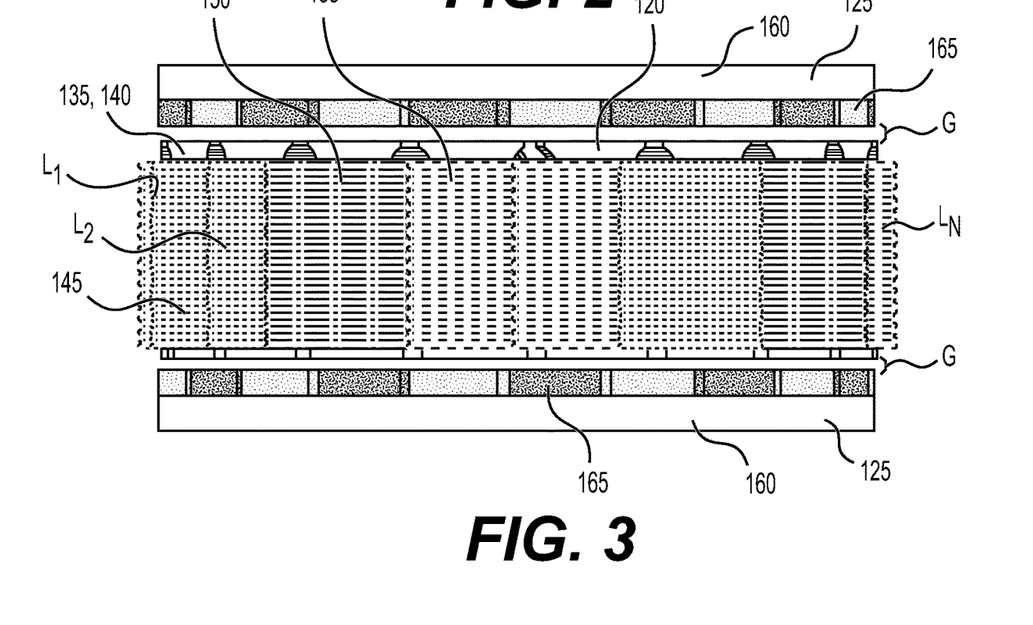
FIG. 3 is a schematic side view of the axial flux motor shown in FIG. 1, according to one or more embodiments.

FIG. 2 also shows the magnet wire 130 wound in or on the slots 215 of each stator pole 135 of the stator 115. The magnet wire 130 is wound around the stator poles 135 to form stator coils 210, and, as shown in FIG. 3, may include a plurality of lengths L1, L2, . . . , LN, of magnet wire 130, with each length L1, L2, . . . , LN, being wound around one stator pole 135, or a plurality of stator poles 135, in phased windings, in that the wires carry current at different timings, or phases. The different phased windings, shown in FIG. 3 using three types of dashed lines, are depicted with short dashed lines 145, dash-dot dashed lines 150, and long dashed lines 155. The phased windings may be multiphase windings. For example, the phased windings may carry three phase currents that builds up rotating magnetic field in the two axial airgaps G between the rotors 125 and the stator 115.

Figure 4:
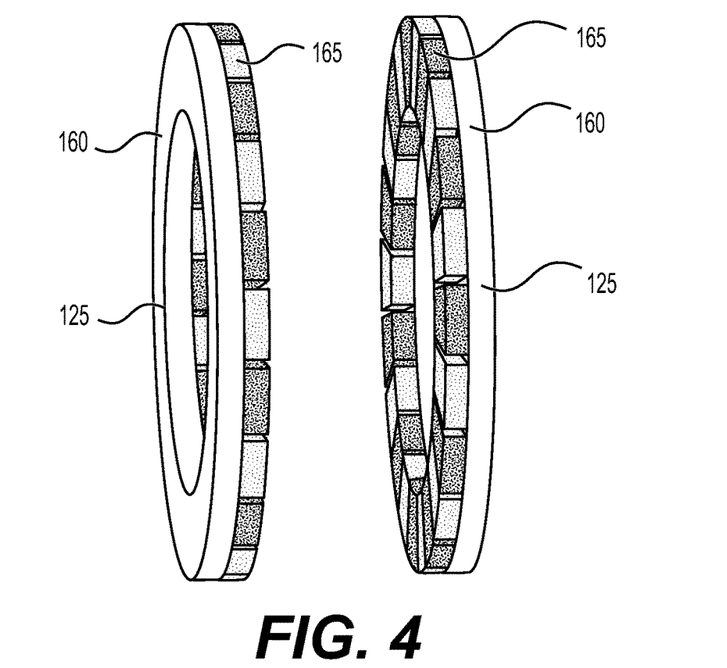
FIG. 4 is a schematic side view of rotors of the axial flux motor shown in FIGS. 1 and 3, according to one or more embodiments.

FIG. 3 shows the rotors 125 of the axial flux motor 100 from a side view, and FIG. 4 shows an isometric view of the rotors 125. Each rotor 125 includes a back plate or disc 160, with a plurality of magnets 165 arranged radially on a stator-facing surface thereof. Each disc 160 may be formed of iron, ceramic, such as Macor®, carbon fiber, or aluminum. The plurality of magnets 165 may be, for example, rare earth magnets. The plurality of magnets 165 may be arranged such that a polarity of each magnet is opposite to a polarity of each adjacent magnet.

Figure 5:
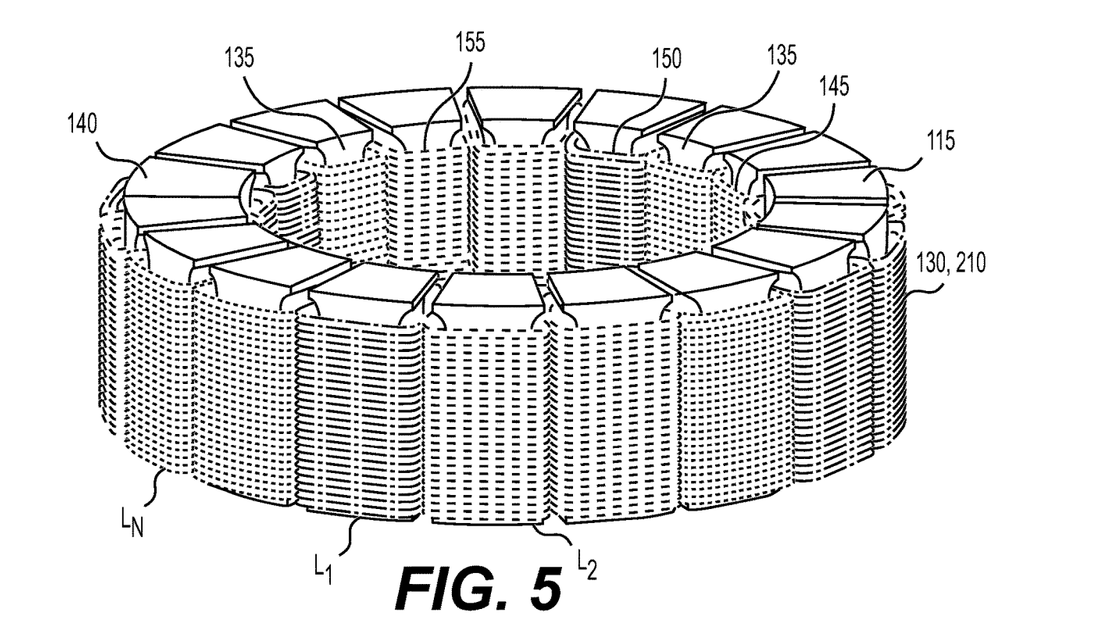
FIG. 5 is a schematic top view of the stator and the magnet wire of the axial flux motor shown in FIGS. 1, 3, and 4.

FIG. 5 is a schematic perspective view of the stator 115 and the magnet wire 130. The different phases of the multiphase windings of the magnet wire 130 are again depicted using different dashed lines 145, 150, and 155. FIG. 5 also shows the plurality of lengths L1, L2, . . . , LN, of the magnet wire 130 being wound around the stator poles 135 of the stator 115.

Figure 6:
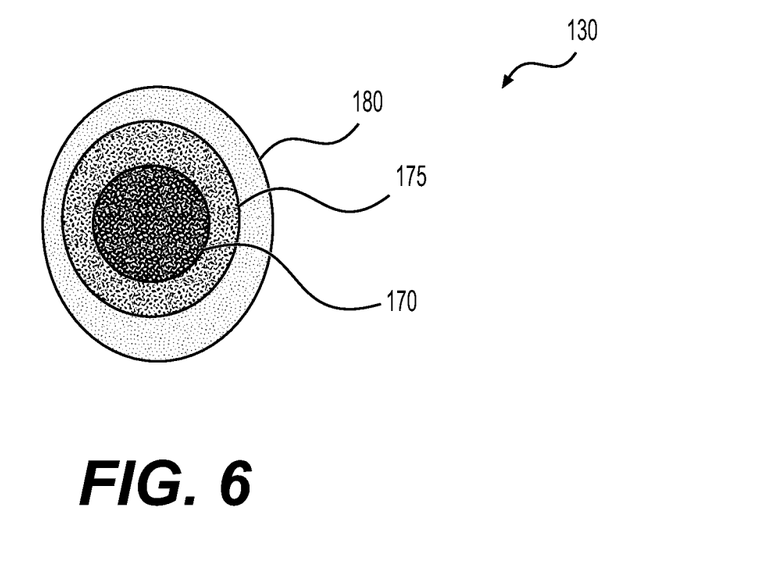
FIG. 6 is a cross-sectional view of the magnet wire of the axial flux motor shown in FIGS. 1-3, and 5.

FIG. 6 is a schematic cross-sectional view of the magnet wire 130. The magnet wire 130 includes a coolant flow passage 170, a copper tube 175, and a green glass coating 180, all concentrically arranged. The coolant flow passage 170 is formed with the hollow copper tube 175, and allows for cooling of the stator 115 by removing heat developed in the stator 115 during operation of the axial flux motor 100. In addition or alternatively, a tube may be installed within the coolant flow passage 170 to allow for passing of coolant to cool the stator 115. The copper tube 175 is coated with the green glass coating 180, which is a formulated wire coating consisting of glass solids suspended into an aqueous solution containing surfactants, solvents, and polymers, which are used to coat a single strand of magnet wire 130 using typical industrial methods. During the application of the green glass coating 180, the coated wire is cured, or baked, at a set temperature to enable the coated wire to be applied to, or used in, electro-magnetic (EM) assemblies and machines in the same manner as a polyimide coated wire. The cured coating is durable and can be manipulated without damage during assembly. Once the assembly is completed, a final heat curing, or "firing," is performed to set the final chemistry to remove all carbon chemistry, making the cured, coated magnet wire 130 capable of operating at 1000° F. with long term exposure.

Interaction of the magnetic fields formed by the magnet wire 130 on the stator 115 and by the magnets on the rotors 125 creates torque, thereby rotating the rotors 125 and, therefore, the shaft 110 on which the rotors 125 are mounted. The shaft 110 outputs the torque to other machines parts via mechanical connections between the shaft 110 and such other parts. Specifically, magnetic flux, generated by the interaction of the magnetic fields, passes axially (that is, along an axis that is parallel to the longitudinal axis A-A of the shaft 110) through a stator pole 135 of the stator 115, and immediately arrives at a magnet, of the plurality of magnets 165. In other words, a path of the magnetic flux through the stator 115 is one-dimensional, or unidirectional, by virtue of the grain-oriented steel. By virtue of the magnets 165 being placed on a surface of each rotor 125, and the stator 115 with the magnet wire 130 being positioned between the rotors 125, a rotating magnetic field can be formed, or built up, within the axial airgaps G between the rotors 125 and the stator 115. The magnetic flux generated by the interacting magnetic fields has a relatively straight and short path through these airgaps G. As a result of the materials used and the forming of the airgaps G, as described herein and shown in the figures, an axial flux motor 100 of this disclosure may have approximately 60% to approximately 80% lower leakage flux as compared to currently available axial flux motors.

In addition, the green glass coated magnet wire 130 allows for an axial flux motor 100 that can withstand relatively higher temperatures of up to 1000° F., for example, as compared to currently available insulated magnet wire 130. The green glass coated magnet wire 130 also allows for increased current density, specifically, increased up to four times the current density available using currently available insulated magnet wire 130.

Figure 7:
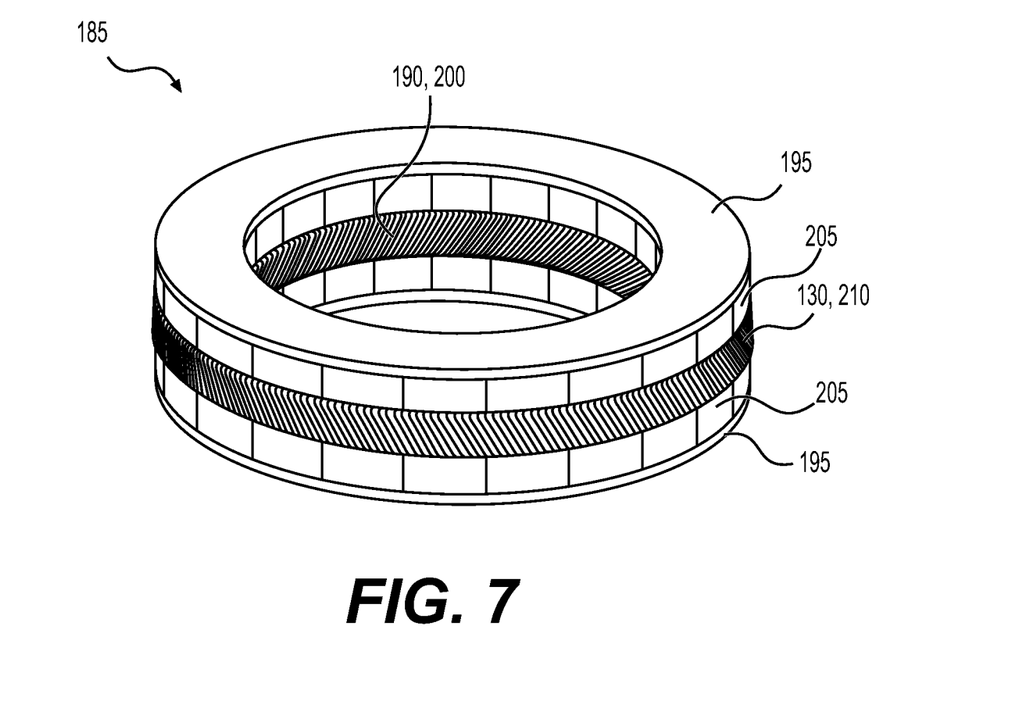
FIG. 7 is a schematic perspective view of a coreless stator and rotors of a dual rotor axial flux motor, according to one or more embodiments.

FIG. 7 is a schematic perspective view of a dual rotor axial flux motor 185 according to another embodiment. The axial flux motor 185 includes a stator 190 and rotors 195. The stator 190 of this embodiment may include a body 200 which does not contain iron, and the magnet wire 130 may be wound as one continuous winding around the body 200 of the stator 190, as shown. The green glass coated wire 130 for the axial flux motor 185 of this embodiment provides high power output with seamlessly high speed due to the absence of iron in the stator 190. The axial flux motor 185 of this embodiment includes two rotors 195, provided on opposing sides of the stator 190. Each rotor 195 has a plurality of magnets 205 mounted thereon. The magnets 205 are mounted on stator-facing surfaces of the rotors 195, as shown.

Figure 8:
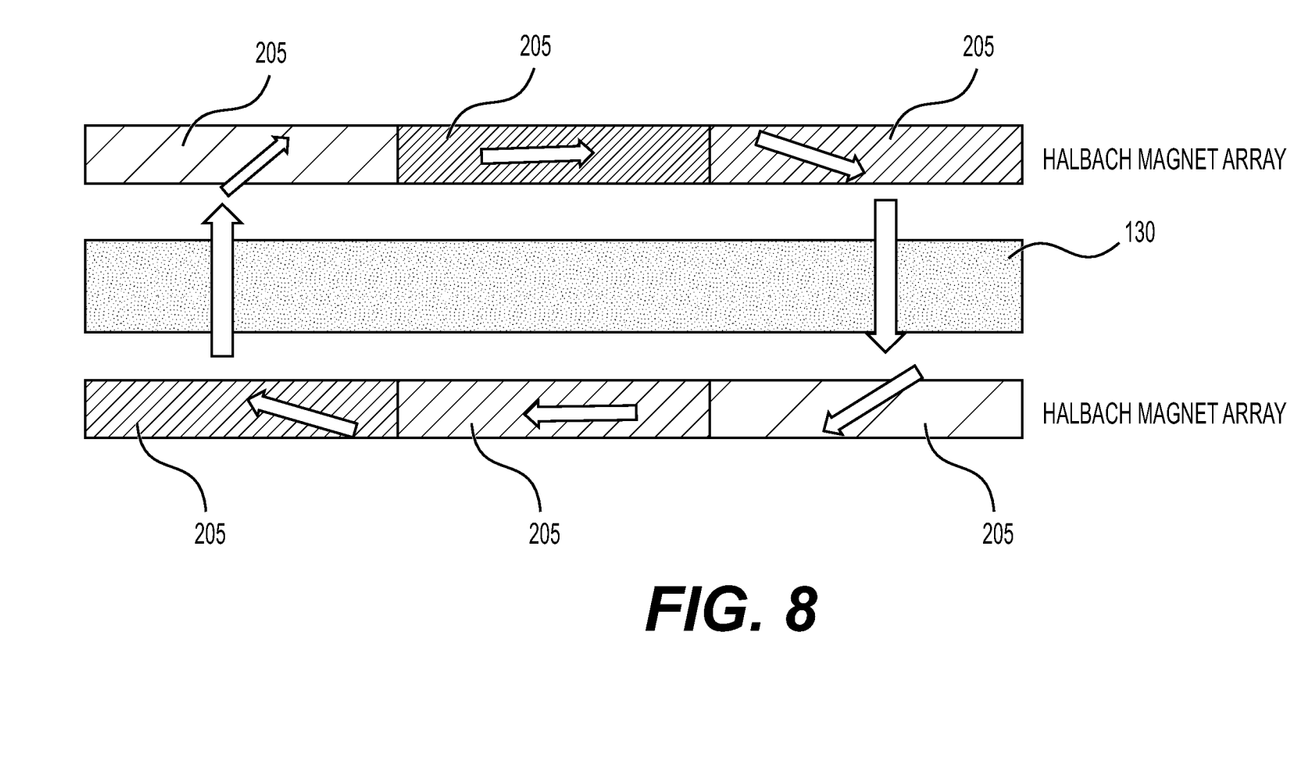
FIG. 8 is a schematic view of an arrangement of magnets on the rotors and the stator winding with a magnetic flux flow path shown in FIG. 7.

FIG. 8 shows the plurality of magnets 205 provided on the rotors 195 of the embodiment shown in FIG. 7. In this embodiment, the plurality of magnets 205 on each rotor 195 may be installed in a Halbach Magnet Array, as would be understood by a person skilled in the art, and as shown. The arrows in FIG. 8 depict a direction of flow of the magnetic flux through the plurality of magnets 205 and the magnet wire 130.

Figure 9:
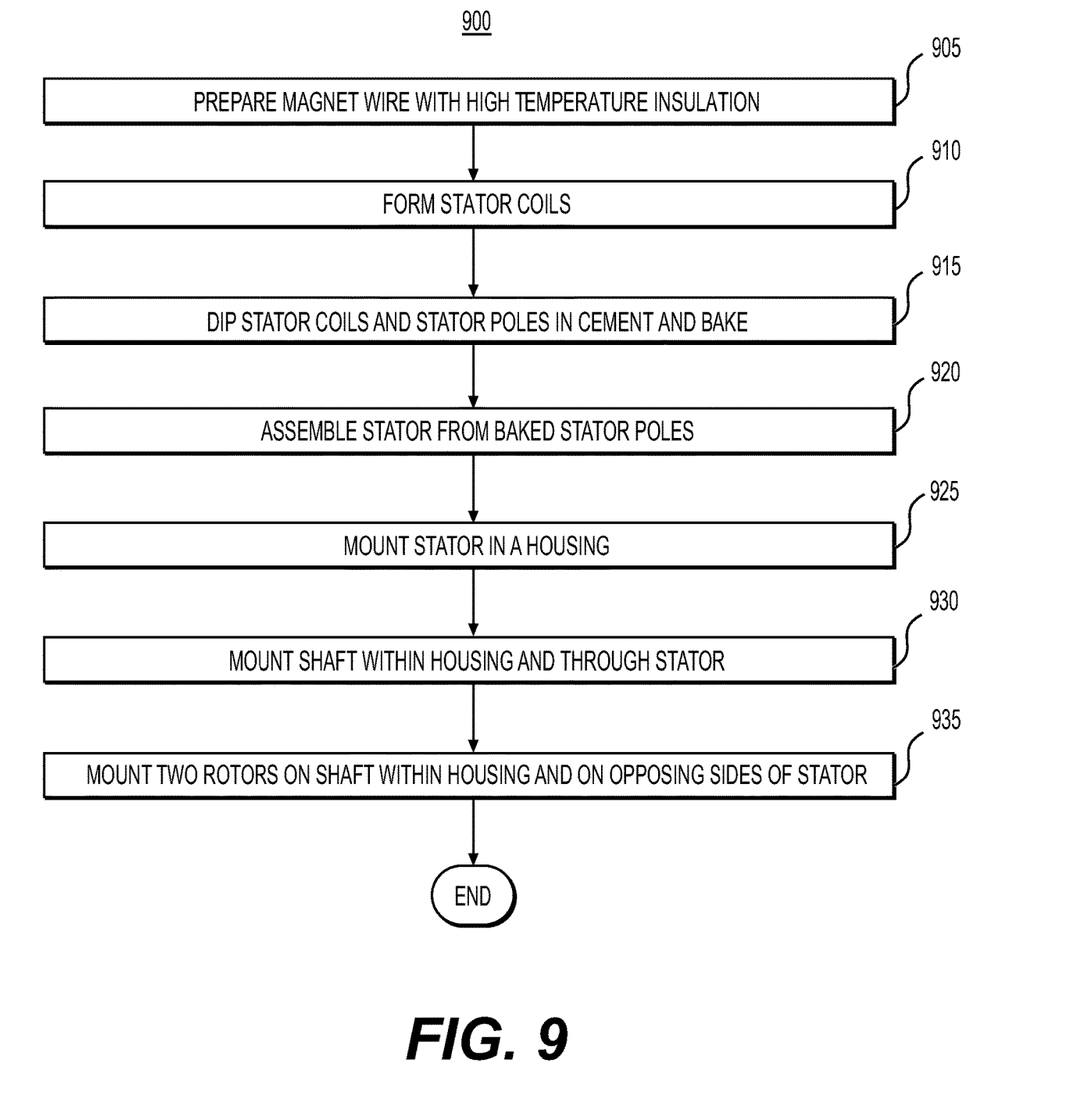
FIG. 9 is a flowchart depicting a method of manufacturing a dual rotor axial flux motor, according to one or more embodiments.

FIG. 9 is a flowchart depicting a method 900 of manufacturing an axial flux motor 100, according to one or more embodiments. The method 900 includes a step 905 of preparing a magnet wire 130 with a high temperature insulation. In particular, step 905 may include providing a copper tube 175 with a coolant flow passage 170 therein, forming a liquid green glass coating 180, including suspending glass solids in an aqueous solution containing one or more surfactants, solvents, and polymers, coating the copper tube 175 with the liquid green glass coating 180, and heating the coated copper tube 175, thereby removing carbon from the coated copper tube 175, and thereby forming the magnetic wire 130. The method 900 may also include a step 910 of making or forming stator coils 210 out of the prepared magnet wire 130. This step may include winding the magnet wire 130 around the stator slots 215 of stator poles 135 of the stator 115. The method may also include a step 915 of dipping the stator coils 210 into cement, and baking at a set or predetermined temperature. Further, the method may include a step 920 of assembling the stator 115 by connecting the baked stator poles, having the stator coils thereon, together using a stator ring 220, as shown in FIG. 1. The method 900 also includes a step 925 of mounting the stator 115 in a housing 105, a step 930 of mounting a shaft 110 rotatably within the housing 105, the shaft 105 extending through a through-hole within the stator 115, and a step 935 of mounting two rotors 125 on the shaft 110 within the housing 105, the two rotors 125 being mounted on opposing sides of the stator 115.

Although the method 900 is described herein as including steps 905 to 935, the method may include a subset of these steps or additional steps.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value. The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An axial flux motor comprising:
   a motor housing;
   a shaft rotatably mounted in the motor housing;
   a stator mounted in the motor housing, and having a stator ring and a through-hole through which the shaft extends;
   two rotors mounted on the shaft within the motor housing on opposing sides of the stator, each rotor having a plurality of magnets arranged radially on a stator-facing surface thereof; and
   a magnet wire wound on portions of the stator, the magnet wire comprising an inner coolant passage disposed within a copper tube, and a green glass coating on an outer surface of the copper tube, the green glass coating comprising glass solids, one or more of surfactants, solvents, and polymers.

2. The motor of claim 1, wherein axial air gaps are provided between the stator and each of the two rotors with respect to a longitudinal axis of the shaft.

3. The motor of claim 1, wherein the magnet wire is wound in a multi-phase winding.

4. The motor of claim 3, wherein the magnet wire is wound in a three-phase winding.

5. The motor of claim 1, wherein the plurality of magnets on each of the rotors includes magnets arranged in a Halbach magnet array.

6. The motor of claim 1, wherein the stator comprises a non-magnetic core formed of a material selected from a group consisting of ceramic, carbon fiber, and/or aluminum.

7. The motor of claim 1, wherein the stator is formed of a grain oriented magnetic steel.

8. The motor of claim 1, wherein the stator is formed of an amorphous metal.

9. The motor of claim 1, wherein each of the two rotors is a disc, and wherein each of the two rotors is formed of a material selected from a group consisting of ceramic, carbon fiber, and/or aluminum.

10. The motor of claim 1, wherein the stator further comprises steel lamination.

11. An axial flux motor comprising:
    a motor housing;
    a shaft rotatably mounted in the motor housing;

a stator mounted in the motor housing, and having a through-hole through which the shaft extends, and being formed of a grain-oriented magnetic steel;

two rotors mounted on the shaft within the motor housing on opposing sides of the stator, each rotor having a plurality of magnets arranged radially on a stator-facing thereof, the two rotors being formed of steel; and magnet wire wound around the stator, the magnet wire comprising an inner coolant passage disposed within a copper tube, and a green glass coating on an outer surface of the copper tube, the green glass coating comprising glass solids, one or more of surfactants, solvents, and polymers, and the magnet wire being arranged in a three-phase winding.

12. The motor of claim 11, wherein axial air gaps are provided between the stator and each of the two rotors with respect to a longitudinal axis of the shaft.

13. The motor of claim 11, wherein the plurality of magnets on each of the rotors includes magnets arranged in a Halbach magnet array.

14. The motor of claim 11, wherein the stator further comprises steel lamination.

15. A method of manufacturing an axial flux motor, the method comprising:

preparing a magnet wire with a high temperature insulation, including:

providing a copper tube having a coolant passage therein;

forming a liquid green glass coating, including suspending glass solids in an aqueous solution containing one or more surfactants, solvents, and polymers;

coating the copper tube with the liquid green glass; and heating the coated copper tube, thereby removing carbon from the coated copper wire, and forming the magnet wire;

forming stator coils by winding the magnet wire around each of a plurality of stator poles;

dipping the plurality of stator poles including the stator coils into cement;

baking the dipped plurality of stator poles including the stator coils at a predetermined temperature;

assembling the plurality of stator poles with a stator ring, thereby forming a stator;

mounting the stator in a housing;

mounting a shaft rotatably within the housing, the shaft extending through a through-hole of the stator; and mounting two rotors on the shaft within the housing, the two rotors being mounted on opposing sides of the stator, and each rotor having a plurality of magnets arranged radially on a stator-facing surface thereof.

16. The method of claim 15, wherein axial air gaps are provided between the stator and each of the two rotors with respect to a longitudinal axis of the shaft.

17. The method of claim 15, wherein the magnet wire is wound in a multi-phase winding.

18. The method of claim 17, wherein the magnet wire is wound in a three-phase winding.

19. The method of claim 15, wherein the plurality of magnets on each of the rotors includes magnets arranged in a Halbach magnet array.

20. The method of claim 15, wherein the stator further comprises steel lamination.

* * * * *